United States Patent Office 3,524,630
Patented Aug. 18, 1970

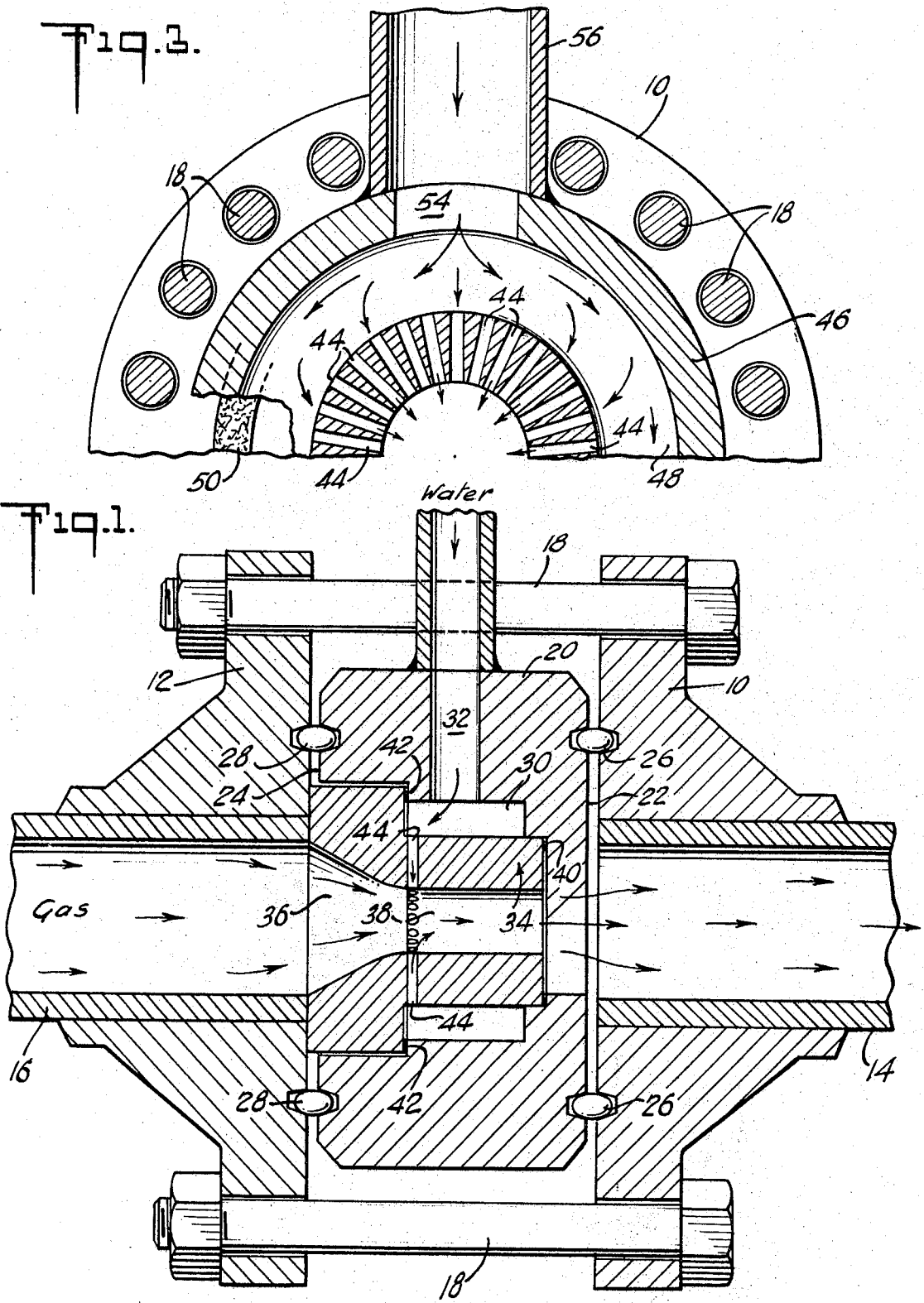

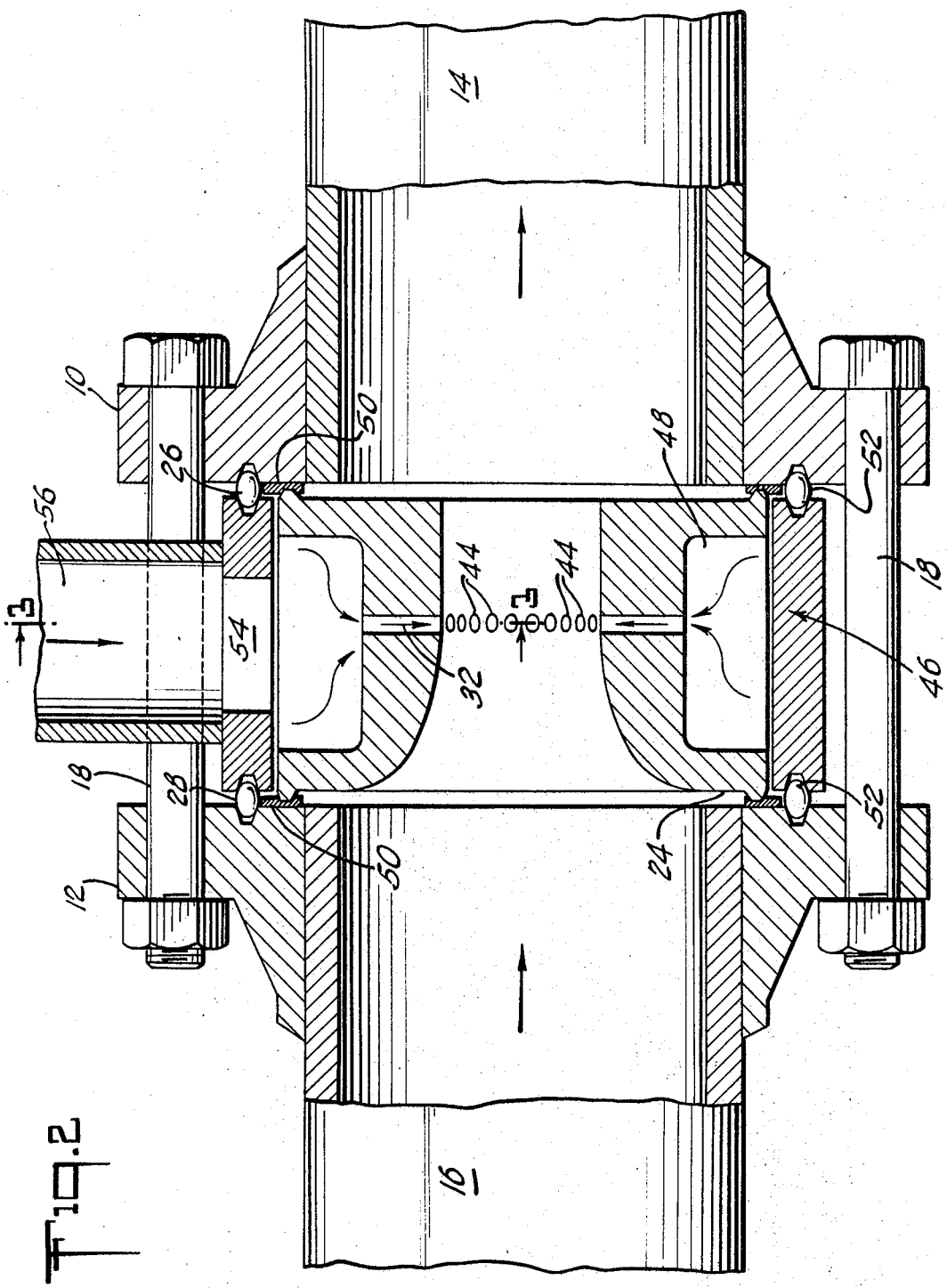

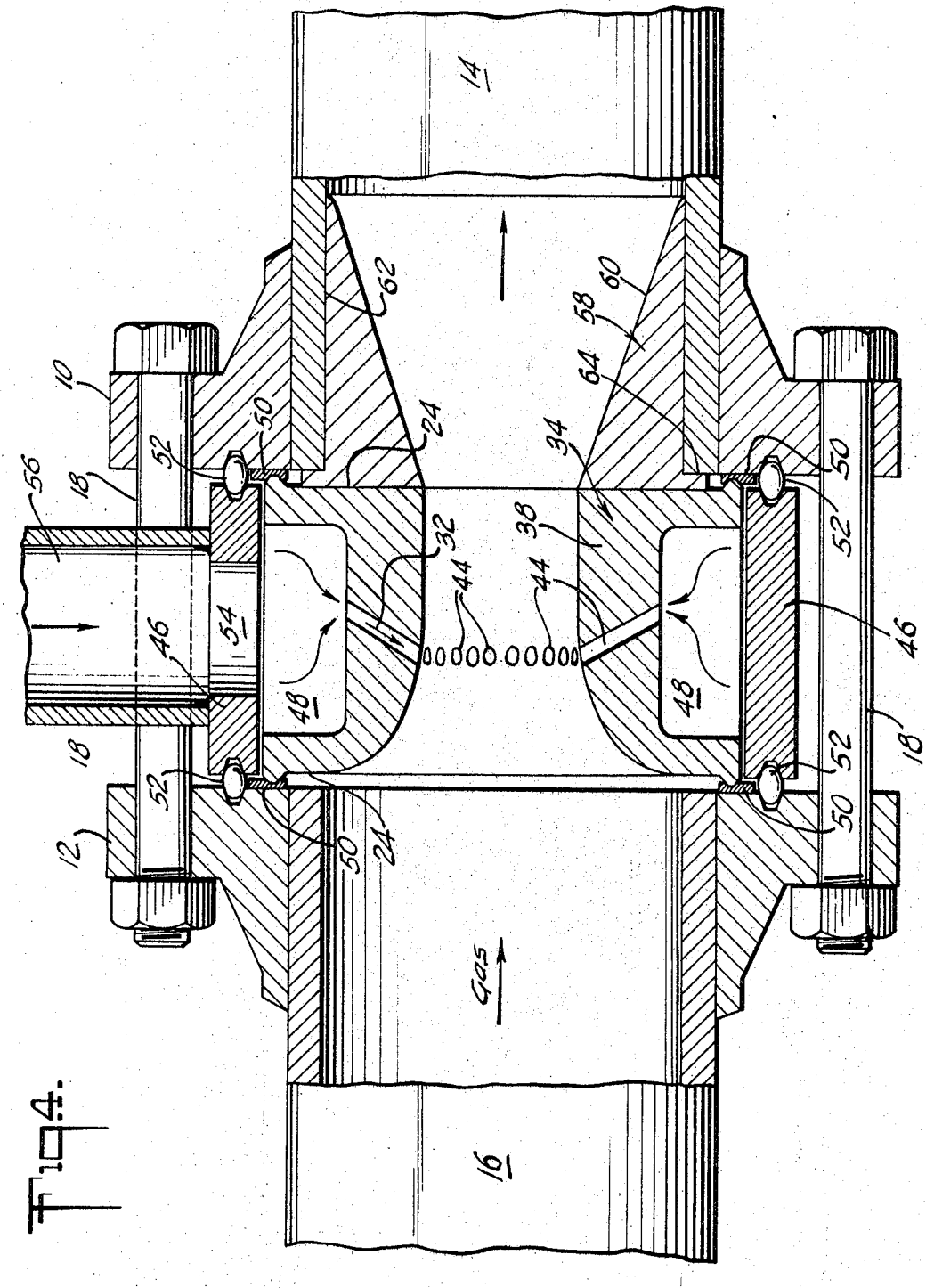

3,524,630
SCRUBBING NOZZLE FOR REMOVING UNCONVERTED CARBON PARTICLES FROM GAS
Charles P. Marion, Mamaroneck, N.Y., assignor to Texaco Development Corporation, New York, N.Y., a corporation of Delaware
Filed July 1, 1968, Ser. No. 741,494
Int. Cl. B01d 47/10
U.S. Cl. 261—76          4 Claims

ABSTRACT OF THE DISCLOSURE

A nozzle type gas scrubber for washing impurities from a flow of gas in the form of a spool insertable between the flanges of a pipe coupling and adapted to accelerate the gas stream thru a constricted nozzle where it is washed by injection of streams of wash liquid in the throat of the constriction.

---

The present invention relates to scrubbing gas streams to remove entrained or suspended matter and more specifically is concerned with the so-called nozzle type of scrubber as distinguished from various other scrubbers such as tower scrubbers which ordinarily involve a considerable amount of relatively expensive equipment to effect intimate contact between a great number of rivulets and streams of scrub liquid and a countercurrently flowing gas stream.

It has been found, as indicated in U.S. Pat. No. 2,604,185, that complex and costly scrubbing tower constructions may, for many purposes be obviated by simply injecting a scrubbing liquid into a stream of gas as it passes thru a relatively constricted throat where it is accelerated to a high velocity flow. The particles of scrubbing liquid become atomized in the rapidly moving gas stream and, as they are impacted by the gases, absorb or pick up the multitude of suspended particles and thereafter are coalesced or otherwise separated to remove the contaminant as a suspension or solution in the washing liquid.

In general, the structure and design of a venturi system is relatively involved and necessarily occupies some substantial space. The present invention contemplates a simple scrubber unit which is relatively small, cheap and effective and which can be readily insertable within a standard pipe flange coupling so that it can be employed in any conduit system by simply spreading the pipe flanges and bolting them together in slightly spaced relationship with the spool-like scrubber therebetween. It has additional advantages in that it is not only useful in situations where space is a limitation but provides an easily replaceable unit for systems which are subject to material changes in operating conditions. For example, in a plant where it becomes necessary to radically increase or decrease production or gas flow rates, or some other condition, it is a relatively simple matter to release the fasteners on the pipe flanges and simply insert a more appropriate unit.

In contrast, to remove, dismantle and replace a complex venturi structure might well involve a major plant alteration.

Referring now to the figures of the attached drawing, there are shown certain exemplary embodiments of the present invention wherein:

FIG. 1 is a sectional elevation of the scrubbing nozzle disposed in a gas line;

FIG. 2 is a transverse sectional elevation in the line 2—2 of FIG. 1;

FIGS. 3 and 4 are sectional elevations taken axially thru modified nozzle constructions.

In the specific embodiment of FIG. 1 the nozzle throat comprises an insertable spool shaped unit of the class of inserts sometimes referred to as a "Dutchman," which mounts between opposed spaced pipe flanges 10 and 12 respectively, which are welded, in turn, to aligned lengths of pipe 14 and 16 and joined by suitable fasteners such as bolts 18. The flanges 10 and 12, which form a standard pipe coupling, are separated a short distance to receive the nozzle unit or spool, which, in turn, comprises an outer annular body or sleeve 20 of general cylindrical shape and having opposed axially spaced faces 22 and 24, registering with the corresponding axially opposed faces of the respective flanges 10 and 12.

Annular type joints 26 and 28 are provided to align and seal the members as indicated. The spindle or sleeve 20 is centrally recessed as at 30 to provide an interior, annular, inwardly facing channel communicating with inlet conduit 32, by which it is supplied with scrubbing liquid. Received within outer annular sleeve 20 and forming the inner section of the spool is a throat or nozzle 34 which, as shown, fits centrally and axially within the central recess of annular sleeve 20.

As indicated in detail the nozzle configuration comprises an upstream or entry section 36, sometimes called a convergent section, which conforms to the internal diameter of pipe 16, gradually constricting or contracting to the nominal diameter of the throat portion 38. The throat continues at its pre-selected diameter for a substantial distance to permit the maximum scrubbing action during acceleration of the washing fluid, as will hereinafter appear in greater detail.

Gaskets or packing washers 40 and 42 are provided as indicated to seal the annular passageway 30, and a multiplicity of radial inwardly extending ducts or conduits 44 provide for the injection of the stream of washing fluid into the venturi throat.

It is important to note that the inlet ductwork 44 in the present structure has the advantage that it may comprise almost any number of conduits, thus enabling the injection of substantial quantities of washing liquid such as water, without requiring excessively high flow velocities. This therefore assures a uniform distribution of the washing liquid throughout the high velocity gas stream without necessarily impinging on streams injected from the opposite side of the orifice or nozzle. So also with the present arrangement, relatively larger volumes can be handled.

Also by simply inclining the ducts 44 toward the flow of gas, as indicated by numeral 46 in FIG. 4, the wash liquid can be advantageously directed into the gas stream as it is accelerating and before it reaches the point of greatest restriction. This has the advantage of permitting a somewhat greater residence of wash liquid in the scrubbing zone during which it is under a substantial differential as it is brought up to the speed of flow of the gas stream.

From the foregoing it will be apparent that the present invention is concerned with scrubbing a gas flow by sweeping the gas with a multiplicity of fine droplets of wash liquid which, for an appreciable period, have a relative velocity vector in the axial direction of movement of the gas which is different from that of the gas.

To do this therefore the droplets of wash liquid are initially injected at a velocity which is substantially zero in the axial direction of flow of the gas. During the period that they are brought to the velocity of gas flow they are obviously impacted and swept or traversed by the flow of the gas.

Accordingly, the effectiveness of scrubbing varies with the degree of fineness of the droplets of scrubbing liquid. To assure that they are uniformly distributed throughout the moving gas stream it is preferred to supply a large multiplicity of injection streams so that each supplies wash liquid to a predetermined radial section of the gas flow, as distinguished, for example, from channelling the liquid into the central part of the gas flow by high pressure injection. There the high velocity gas stream sharply tears the liquid into fine streams of ligaments which immediately collapse into minute droplets which then are accelerated to the speed of the gas stream. Also it is important to provide a constricted throat of substantial axial length to permit contact throughout the period of highest velocity acceleration. By the same token it is advantageous to inject the liquid thru the front of the throat as may be done as indicated in FIG. 4. Also it will be apparent from the above that the wash liquid is not limited to aqueous liquids but can comprise any liquid receptive to the components or particles to be removed. For example, the removal of particles of carbon or coke are frequently better recovered by a hydrocarbon wash liquid.

The liquid is substantially separated from the gas stream by another suitable separator such as a knockout or separation drum, as shown for example in U.S. Pat. No. 2,604,185, to which reference is made to illustrate such equipment, which, per se, forms no part of the present invention.

Referring now to the embodiment of the invention shown in FIGS. 2 and 3, the outer annular body of the spool comprises a simple annular collar or sleeve 46 which embraces the inner section or nozzle 34. In this embodiment the inner section 34 is provided with a radially outwardly facing annular channel 48, provided, as in the previous embodiment, with radial ducts 44. The collar 46 therefore encloses the channel 48 and seals it off by means of washers 50 and annular sealing members 52. An aperture in the annular collar 46 as at 54 permits communication between the annular channel 48 and an inlet duct 56 for introduction of the wash liquid which, as indicated, may be supplied in relatively large volume without necessitating the use of excessive pressure differentials.

FIG. 4 illustrates a yet further modified arrangement providing a diffusion section which, by streamlining the expansion of the high speed stream from the venturi throat, permits diffusion of the high speed flow therein down to the normal level of flow rate prevailing in the conduit. To this end a nozzle extension 58, which fits easily within the conduit 14, is provided with a gradually dilating or expanding internal passageway 60, which at its forward end merges with the throat diameter 38 and, at its downstream extremity merges with the duct 14 as shown.

This diffuser has the advantage of recovering somewhat the pressure drop occurring through the throat of the nozzle where this is an important factor. On the other hand, an abrupt divergence at the end of the straight throat, as shown in FIGS. 1 and 2 tends to throw the gas stream into turbulence at this point with maximum energy dissipation which accordingly tends, to some extent, to create repeated relative velocity vector differentials between the gas and liquid droplets, and accordingly provides additional scrubbing.

Accordingly therefore release of the high speed stream from the throat into the sharply expanded chamber 10, as in FIG. 1 may be advantageous in high pressure systems where a substantial pressure drop across the nozzle can be tolerated. On the other hand, in systems where pressure must be conserved, the diffuser sleeve 58 performs the function of enabilng scrubbing with a minimum energy loss.

The construction of the sleeve or insert 58 involves an outer cylindrical surface 62, adapted to be received readily within the pipe or duct 14 as shown. Preferably clearances are such as to provide "slip-fit" so that the member is readily insertable into the conduit by hand. Positive location of the sleeve in the position shown is maintained by annular collar or flange 64 at the inner extremity of the sleeve, so proportioned as to fit snugly between the downstream face 24 of the spindle or spool 34 and the axial extremity of conduit 14 as shown.

In operation therefore, with the bolts 18 removed, the venturi spool assembly shown in FIGS. 1, 2 and/or 3 is simply slipped into position and the bolts inserted and tightened. The water conduit 32 or 56 may then be coupled to a source of wash liquid, although where the frequent changes are to be made a flexible inlet pipe can be employed.

In instances where the diffuser sleeve 58 is to be employed, this being not appreciably greater in axial dimension than the venturi spool insert, it can be readily slipped into position before the spool per se is inserted. Conversely, when the venturi is to be changed, the sleeve 58 can be axially withdrawn from the pipe after the venturi spool has been removed.

Furthermore, it is important to know that the sleeve 58, instead of embodying the internal expanding diameter of a diffuser, may on the contrary from a continuation of the throat 38, namely a passageway having precisely the same internal diameter as the throat 38 but providing a substantial axial extension thereof.

Thus, as above intimated, inasmuch as the washing or scrubbing effect takes place during the time that the particles of washing fluid are being accelerated to the speed of the gas flow in the nozzle, it accordingly follows that the washing efficiency improves and reaches a maximum when the liquid particles have ultimately reached gas velocity. For this reason, therefore it is advantageous to provide an extension of the throat 38 sufficient to accomplish this, for example, for an axial extension as much as ten times the throat diameter, or more.

Also an insert of this type may likewise incorporate at the downstream end, a dilating or expanding passageway with an internal configuration such as that of the sleeve 58 shown in FIG. 4.

In any event it will be apparent that the sleeve, whatever the configuration of the internal passageway thereof, may be constructed for insertion into the pipe as in FIG. 4 and may, if desired, be provided with flange 64 or other suitable means to hold it in position.

As previously indicated, the particular advantage in addition to the simplicity and economy of the present device is the fact that the scrubbing throat can be changed or altered by a simple mechanical operation in order to meet operating changes in the process, by simply unfastening the flanges and replacing the venturi nozzle or throat. Obviously many other embodiments will be apparent within the general scope of the invention as disclosed above.

I claim:

1. In a system for scrubbing a flow of gas with a scrubbing liquid, a gas flow conduit, a pipe coupling in said conduit comprising spaced opposed pipe flanges, fastening means joining said opposed flanges to hold them in spaced position, a nozzle scrubbing spool received between said pipe flanges and comprising an outer sleeve in coaxial relationship to said conduit and a removable venturi nozzle axially insertable within said sleeve and comprising a central venturi throat passage having a convergent section decreasing in size from that of the inlet conduit to a substantially constricted throat section and continuing through a straight section of substantially unvarying transverse dimension, said straight section discharging into the downstream conduit, said outer sleeve comprising a central passageway having a relatively large axial bore extending inwardly at one axial extremity, followed by a plurality of axially spaced and aligned bores of successively decreasing diameter extending therethrough, a first annular shoulder extending radially at the inner extremity of said large bore of said sleeve and a second annular radially extending shoulder at the inner end of said smallest bore, said insert nozzle having at one axial extremity a relatively large cylindrical portion and an annular radially extending shoulder registering with said first bore and shoulder of said sleeve, a reduced diameter portion extending coaxially therefrom and terminating in a second annular radial shoulder registering with the second shoulder of said sleeve, gasket means arranged between said respective registering shoulders and compressed by pipe coupling means to seal said annular manifold channel, said outer sleeve and the insert nozzle forming therebetween an annular channel, and a multiplicity of radially disposed passageways, extending through the nozzle from the annular duct to the venturi throat and means for supplying washing liquid to said annular duct for injection through said radially disposed passageways into said throat.

2. A gas scrubber as defined in claim 1 wherein said radially disposed passageways have a substantial inclination axially in an upstream direction.

3. In a system for scrubbing a flow of gas with a scrubbing liquid, a gas flow conduit, a pipe coupling in said conduit comprising spaced opposed pipe flanges, fastening means joining said opposed flanges to hold them in spaced position, a nozzle scrubbing spool received between said pipe flanges and comprising an outer annular sleeve in coaxial relationship to said conduit, a removable nozzle providing an internal constricted throat insertable coaxially within said sleeve and forming between said nozzle and said sleeve an annular manifold channel for wash liquid, radially disposed passageways extending from said manifold into said throat, means for supplying wash liquid to said manifold, said throat and nozzle having an axial dimension not greater than the operative spacing of said flanges, a diffuser sleeve having a cylindrical outer diameter approximately the same as the inside diameter of said conduit and being slidably receivable therein downstream of said spool, said diffuser sleeve having an axial passageway merging at its upstream end with the throat of said nozzle and dilating to a diameter substantially equal to that of the conduit at its downstream extremity, said diffuser sleeve having an axial dimension substantially equal to the said spacing between said opposed pipe flanges.

4. A gas scrubber as defined in claim 3 wherein said diffuser sleeve is provided with a radial flange at its upstream axial extremity, said flange extending radially outwardly beyond said cylindrical outer surface and receivable between said conduit and said spool for retaining said diffuser in position.

References Cited

UNITED STATES PATENTS

| | | | |
|---|---|---|---|
| 1,172,432 | 2/1916 | Clark | 261—76 |
| 2,115,077 | 4/1938 | Kommer | 261—75 |

FOREIGN PATENTS

| | | |
|---|---|---|
| 413,305 | 7/1934 | Great Britain. |

FRANK W. LUTTER, Primary Examiner

S. H. MARKOWITZ, Assistant Examiner

U.S. Cl. X.R.

261—78, 117, 118